(12) United States Patent
Persson

(10) Patent No.: US 11,582,418 B1
(45) Date of Patent: Feb. 14, 2023

(54) SECURED COMMUNICATIONS WITH DISPLAY DEVICE

(71) Applicant: Cisco Technology, Inc., San Jose, CA (US)

(72) Inventor: Lars Johan Persson, Blommenholm (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 31 days.

(21) Appl. No.: 17/104,728

(22) Filed: Nov. 25, 2020

Related U.S. Application Data

(60) Provisional application No. 62/957,409, filed on Jan. 6, 2020.

(51) Int. Cl.
*H04N 7/14* (2006.01)
*H04L 65/1069* (2022.01)
*H04L 9/40* (2022.01)
*H04N 7/10* (2006.01)
*H04N 7/01* (2006.01)

(52) U.S. Cl.
CPC ......... *H04N 7/147* (2013.01); *H04L 63/0428* (2013.01); *H04L 63/0823* (2013.01); *H04L 65/1069* (2013.01); *H04N 7/0147* (2013.01); *H04N 7/10* (2013.01)

(58) Field of Classification Search
None
See application file for complete search history.

(56) References Cited

U.S. PATENT DOCUMENTS

| 8,594,850 | B1* | 11/2013 | Gourlay | G05B 15/02 165/203 |
| 2009/0089842 | A1 | 4/2009 | Perry et al. | |
| 2012/0079473 | A1 | 3/2012 | Watanabe et al. | |
| 2014/0068585 | A1* | 3/2014 | Young | G06F 21/572 717/168 |
| 2014/0082227 | A1* | 3/2014 | Beel | H04N 7/15 710/11 |
| 2016/0117165 | A1* | 4/2016 | Cavalaris | G06F 8/63 717/169 |

(Continued)

FOREIGN PATENT DOCUMENTS

| JP | 2012243247 A | 12/2012 |
| KR | 20110041143 A | 4/2011 |
| KR | 20160054901 A | 5/2016 |

OTHER PUBLICATIONS

Cisco, "Cisco Webex Room Kit", Cisco Public, Oct. 2019, 11 pages.

*Primary Examiner* — Quoc D Tran
(74) *Attorney, Agent, or Firm* — Edell, Shapiro & Finnan, LLC

(57) ABSTRACT

Techniques are provided herein for secure display device communications. In one example, a video communications device provides, to a display device over a first connection, communication information that enables the display device to contact a server over a second connection. The video communications device further provides, to the display device over the first connection, a command configured to initiate an interaction with the server. The server obtains, from the display device over the second connection, a message initiating the interaction in response to the command based on the communication information.

20 Claims, 4 Drawing Sheets

(56) References Cited

U.S. PATENT DOCUMENTS

| | | | |
|---|---|---|---|
| 2016/0202964 A1* | 7/2016 | Butcher | G06F 9/4416 |
| | | | 717/172 |
| 2017/0185418 A1* | 6/2017 | Huang | G06F 8/63 |
| 2017/0206077 A1* | 7/2017 | Kulkarni | G06F 8/654 |
| 2018/0018161 A1* | 1/2018 | Gattu | G06F 8/654 |
| 2019/0004785 A1* | 1/2019 | Kelley | H04L 63/0428 |
| 2019/0058351 A1* | 2/2019 | Chang | H02J 7/35 |

* cited by examiner

SECURED COMMUNICATIONS WITH DISPLAY DEVICE

CROSS REFERENCE TO RELATED APPLICATION

This application claims the benefit of U.S. Provisional Application No. 62/957,409, filed Jan. 6, 2020, the entirety of which is incorporated herein by reference.

TECHNICAL FIELD

The present disclosure relates to electronic display devices.

BACKGROUND

Video communications system are often built with parts/devices from multiple manufacturers, and the manner in which these parts/devices interact can impact the overall user experience. One common scenario involves a third-party display used with a video communications device (e.g., the Cisco Webex™ Room Kit). Third-party displays often have firmware/software with built-in intelligence that is designed by the display manufacturers. There can be tens or even hundreds of different settings that control the behavior and user experience of the displays.

DESCRIPTION OF EXAMPLE EMBODIMENTS

Overview

Techniques are provided herein for secure display device communications. In one example embodiment, a video communications device provides, to a display device over a first connection, communication information that enables the display device to contact a server over a second connection. The video communications device further provides, to the display device over the first connection, a command configured to initiate an interaction with the server. The server obtains, from the display device over the second connection, a message initiating the interaction in response to the command based on the communication information.

EXAMPLE EMBODIMENTS

Figure 1:
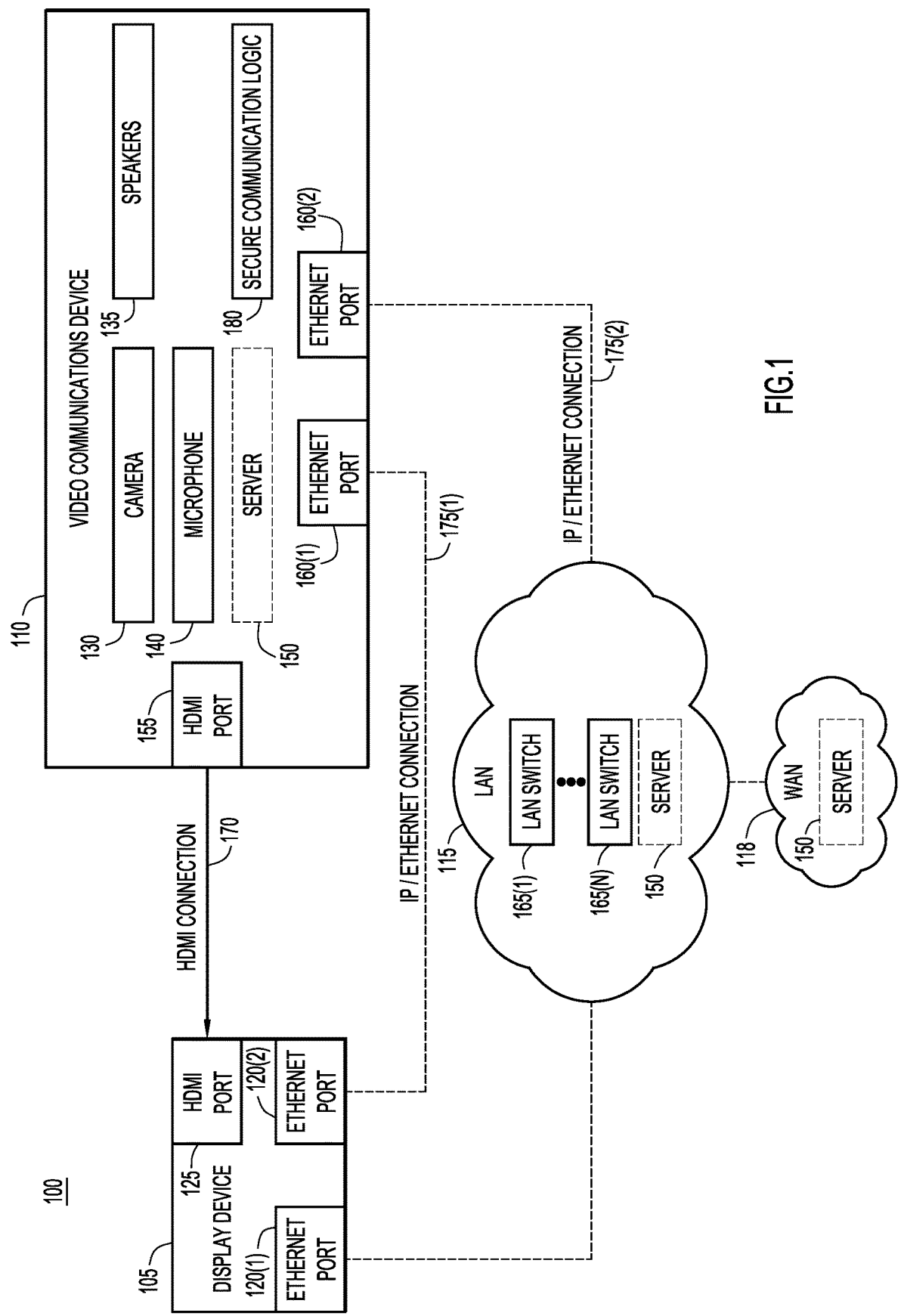
FIG. 1 illustrates a block diagram of a system configured for secured display device communications, according to an example embodiment.

FIG. 1 illustrates a block diagram of an example system 100 configured for secured display device communications. System 100 includes display device 105, video communications device 110, Local Area Network (LAN) 115, and Wide Area Network (WAN) 118. Display device 105 includes Ethernet ports (e.g., auxiliary Ethernet ports) 120(1) and 120(2), and High-Definition Multimedia Interface (HDMI) port (e.g., auxiliary HDMI port) 125. Video communications device 110 includes camera 130, speakers 135, microphone 140, and optionally server (e.g., web server) 150. Video communications device 110 further includes HDMI port (e.g., auxiliary HDMI port) 155 and Ethernet ports (e.g., auxiliary Ethernet ports) 160(1) and 160(2). LAN 115 includes a plurality of LAN switches 165(1)-165(N) and optionally server 150. System 100 also includes an HDMI connection (e.g., HDMI Consumer Electronics Control (HDMI-CEC) connection) 170 between display device 105 and video communications device 110. HDMI connection 170 may be enabled by an HDMI cable connected to HDMI port 125 and HDMI port 155. WAN 118 may optionally include server 150.

In this example, display device 105 is a third-party display device that is deployed with video communications device 110 to provide coordinated video communications services for a user. In particular, display device 105 may provide video output capabilities (e.g., via a display screen, such as a Light-Emitting Diode (LED) screen), and video communications device 110 may provide video input capabilities via camera 130, audio output capabilities via speakers 135, audio input capabilities via microphone 140, and video and/or audio compression/encoding and decompression/decoding capabilities via codec functionality. Thus, for example, video communications device 110 may receive audio and video signals from a far-end device, output the audio signals via speakers 135, and transmit video signals over HDMI connection 170 for output on display device 105.

Server 150 may include software that provides display device 105 with one or more services (e.g., software or firmware download service, configurable setting read/write service, debugging log management service, display telemetry data processing service, etc.). In one example, video communications device 110 hosts server 150. In this example, server 150 may include software that is integrated with (e.g., located in a memory of) video communications device 110. Alternatively, in another example, video communications device 110 is not configured to host server 150. For instance, server 150 may be a stand-alone server (e.g., with independent/dedicated memory and computing resources) or may be software that is integrated with one or more other network-connected devices of which video communications device 110 is aware. If video communications device 110 is not configured to host server 150, server 150 may be located in LAN 115 or WAN 118, for example, as a stand-alone server or integrated with one or more other network-connected devices.

A user of a video communications system would expect that system to meet user needs regardless of whether a display device and a video communications device in the system were produced by different manufacturers. If the display device and video communications device cannot properly interact on the display device and/or video communications device (e.g., due to problems such as suboptimal settings, software bugs, security holes, etc.), the system would not meet user expectations. Therefore, it is important for the display device and video communications device to be operationally compatible.

However, an Information technology (IT) administrator responsible for a conventional video communications system would find it difficult to ensure that the display device used in the system is running up-to-date software and has settings that cause the display device to operate correctly in conjunction with the video communications device. This task can be particularly cumbersome when the system includes a multitude of display devices and video communications devices.

Furthermore, conventional video communications systems only communicate over an HDMI connection, which is ill-suited for providing automated management of a display device. For example, consider a scenario in which the video communications device needs to provide a software upgrade of the display device. An HDMI cable would not be feasible for that task because the technology is too primitive. HDMI-CEC can only support a bit rate of 400 bytes per second, whereas software images for display device software upgrades can be hundreds or even thousands of megabytes. Thus, conventional video communications systems cannot adequately manage display devices in an automated and practical manner.

Accordingly, described herein are techniques for initiating and facilitating automated management of display device 105 in a scalable and secure fashion. In one example, system 100 further includes Internet Protocol (IP)/Ethernet connection 175(1) and/or IP/Ethernet connection 175(2). IP/Ethernet connection 175(1) and/or IP/Ethernet connection 175(2) may establish a high-bandwidth IP link between display device 105 and video communications device 110 via an Ethernet cable. IP/Ethernet connection 175(1) may be enabled by video communications device 110 exposing an IP subnet that is accessible via Ethernet port 160(1) to which display device 105 is physically connected (e.g., by an Ethernet cable) at install time. IP/Ethernet connection 175(2) may be enabled over LAN 115 (e.g., over one or more of LAN switches 165(1)-165(N)). IP/Ethernet connection 175(1) and/or IP/Ethernet connection 175(2) may be suitable for secure, automated management of display device 105, such as software upgrades.

Video communications device 110 also includes secure communication logic 180 which may cause video communications device 110 to perform operations described herein. Briefly, in one example, video communications device 110 may use HDMI connection 170 to initiate or bootstrap an outbound Hypertext Transfer Protocol (HTTP) or HTTP Secure (HTTPS) call/request over IP/Ethernet connection 175(1) or IP/Ethernet connection 175(2) from display device 105 to video communications device 110. In particular, video communications device 110 may provide, to display device 105 over HDMI connection 170, communication information that enables display device 105 to contact server 150 over IP/Ethernet connection 175(1) or IP/Ethernet connection 175(2). The communication information may point to any given location of server 150 (e.g., video communications device 110, LAN 115, WAN 118, etc.). Video communications device 110 may also provide, to display device 105 over HDMI connection 170, a command configured to initiate an interaction with server 150. Server 150 may obtain, from display device 105 over IP/Ethernet connection 175(1) or IP/Ethernet connection 175(2), a message initiating the interaction in response to the command based on the communication information.

In addition to overcoming the technical limitations of HDMI connection 170 by escalating to higher-bandwidth IP/Ethernet connection 175(1) or IP/Ethernet connection 175(2), these techniques also provide security benefits. Because HDMI connection 170 initiates an action on display device 105, display device 105 does not need to open any additional listening network IP ports/interfaces on the active network to obtain the command. Such network ports/interfaces could be accessible by any entity connected to the active network, which is an inherent security risk. Because server 150 is already running, there is no need to open additional network ports which would carry associated security risks. One reason that server 150 is already running may be that server 150 is used for various remote administration tasks related to video communications device 110, for example, in the case where server 150 is integrated with video communications device 110.

Moreover, no additional hardware changes are necessarily required on display device 105 or video communications device 110. This scheme also enables flexible and secure machine-to-machine communication between display device 105 and video communications device 110, which may be used to guarantee user experience and improve maintainability/manageability/serviceability of system 100. It will be appreciated that the techniques described herein may apply to any suitable device, such as a Cisco Webex Room Kit, video streaming box, etc.

The communication information may indicate how display device 105 can reach video communications device 110, such as the IP address of server 150. The command may prompt display device 105 to perform some function/operation involving server 150, which may be running on the IP interface of video communications device 110. The communication information and command may be included in any suitable number of messages. In one example, the communication information and command may be included in one message. In another example, the communication information may be included in a first message and the command may be included in a second message.

In one example, the command may include a command to download software or firmware from server 150 (e.g., "fetch software and perform software upgrade"). Video communications device 110 may download the software image/package for display device 105 before display device 105 fetches the software image/package. In another example, the command may include a command to read or write at least one configurable setting of display device 105 from or to server 150 (e.g., "write/export configurable settings," "read/import configurable settings," etc.). Server 150 may extract settings used by display device 105, such as settings that impact latency, color representation, and/or power control. In still another example, the command may include a command to provide (e.g., write, export, etc.) a debugging log (e.g., an internal log file useful for debugging) to server 150.

In yet another example, the command may include a command to provide display telemetry data to server 150. The display telemetry data may include telemetry data relating to display device 105, and video communications device 110 may adjust display data sent to display device 105 based on the display telemetry data. For instance, the display telemetry data may include data indicating that the brightness of blue LEDs of display device 105 decreases over time due to inherent physical characteristics of the blue LEDs. In this case, video communications device 110 may compensate for the decrease in the brightness of blue LEDs by increasing the brightness of blue colors in the display data, and sending the display data over HDMI connection 170 for display device 105 to generate video based thereon. Video communications device 110 may also/alternatively provide the display telemetry data to the manufacturer of display device 105.

Additional mechanisms may be employed to further bolster security. In one example, video communications device 110 may provide information (e.g., details) regarding a security certificate (e.g., an HTTPS certificate) to be presented to display device 105 by server 150. Video communications device 110 may provide the information regarding the security certificate in the same message that includes the communication information and/or command, or in a separate message. Server 150 may further present the security certificate to display device 105, for example over IP/Ethernet connection 175(1) and/or IP/Ethernet connection 175(2) in response to display device 105 initiating the interaction with server 150. Display device 105 may determine whether the security certificate matches the information regarding the security certificate, and if there is a match, display device 105 may identify server 150 as a trusted entity. If there is no such match, display device 105 may take any suitable action, such as refraining from carrying the interaction forward, generating an alert, etc. In one specific example, display device 105 may use the information to authenticate that the security certificate was sent by server 150.

In another example, video communications device 110 may share security credentials with display device 105 to enable display device 105 to initiate the interaction with server 150. Video communications device 110 may initially share the security credentials such that display device 105 can reach video communications device 110 over IP/Ethernet connection 175(1) and/or IP/Ethernet connection 175(2). In still another example, video communications device 110 may encrypt the communication information provided over HDMI connection 170 and/or the command provided over HDMI connection 170 with a key that is pre-shared with display device 105. The key may be pre-shared with the display manufacturer, which may manufacture display device 105 to include the pre-shared key. Pre-sharing the key may decrease the likelihood of any unwanted eavesdropping or copying.

While the specific example of system 100 includes HDMI connection 170, it will be appreciated that any suitable first connection may be utilized to employ the techniques described herein. In one example, the first connection may be any suitable wired connection (e.g., HDMI, Universal Serial Bus (USB), serial communication, etc.) or wireless connection (e.g., Wi-Fi®, Bluetooth®, etc.). The first connection may involve video communications device 110 being in physical proximity to display device 105, such as a wired connection that involves physical proximity (e.g., HDMI, USB, etc.) or a wireless connection that involves physical proximity (e.g., Bluetooth, etc.). The physical proximity may serve as a security feature to ensure that display device 105 can trust video communications device 110. For instance, a bad actor would require physical proximity to video communications device 110 to bypass this security feature. In another example, the first connection may be any suitable low-bandwidth connection (e.g., HDMI). In another example, the first connection may be any suitable peer-to-peer connection (e.g., Wi-Fi, Bluetooth, etc.).

Furthermore, while the specific example of system 100 includes IP/Ethernet connection 175(1) and/or IP/Ethernet connection 175(2), it will be appreciated that any suitable second connection may be utilized to employ the techniques described herein. In one example, the second connection may be any suitable high-bandwidth connection. In the specific example where the second connection is an IP connection, the second connection may be a wired connection (e.g., Ethernet) or wireless connection (e.g., Wi-Fi). Any suitable communication information may be used depending on the connection type of the second connection. For example, if the second connection includes a Wi-Fi connection (e.g., a Wi-Fi connection that uses a Wi-Fi peer-to-peer protocol), the communication information may include a Wi-Fi identifier of video communications device 110/server 150. The communication information may also/alternatively include a Media Access Control (MAC) address of video communications device 110/server 150. If the second connection includes a Wi-Fi connection, the security credentials may include credentials for a Wi-Fi network. If the second connection includes a peer-to-peer connection, the security credentials may include some secret that can be used to establish a peer-to-peer connection.

In one example, the first connection and the second connection are a common connection (e.g., the same connection). The common connection may be any suitable high-bandwidth connection that is trusted by both video communications device 110 and display device 105. The common connection may a wired connection, such as Thunderbolt™, USB (e.g., USB3), Ethernet, etc., or a wireless connection, such as Wi-Fi. In one specific example, the common connection is an IP connection established using a secure protocol. In this example, a service (e.g., a proprietary service) may run on an open IP port of display device 105, and video communications device 110 may send the communication information and/or the command over IP to the IP port using the service. Other alternatives to HDMI connection 170 and IP/Ethernet connection 175(1) and/or IP/Ethernet connection 175(2) may be envisioned.

Figure 2:
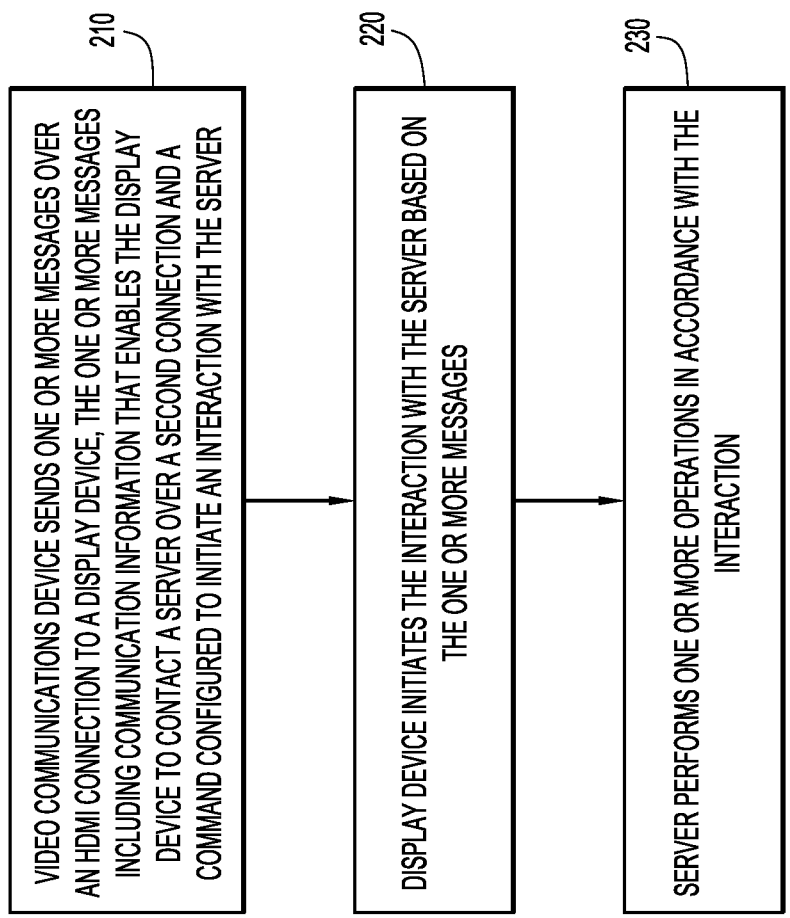
FIG. 2 illustrates a flowchart of a method for securing communications with a display device, according to an example embodiment.

With continuing reference to FIG. 1, FIG. 2 illustrates a flowchart of an example method 200 for securing communications with display device 105. At operation 210, video communications device 110 sends one or more messages over HDMI connection 170 to display device 105. The one or more messages include communication information that enables display device 105 to contact server 150 over IP/Ethernet connection 175(1) or IP/Ethernet connection 175(2) and a command configured to initiate an interaction with server 150. At operation 220, display device 105 initiates the interaction with server 150 based on the one or more messages (e.g., a request for a software update). At operation 230, server 150 performs one or more operations in accordance with the interaction (e.g., providing a software image for the software update).

Figure 3:
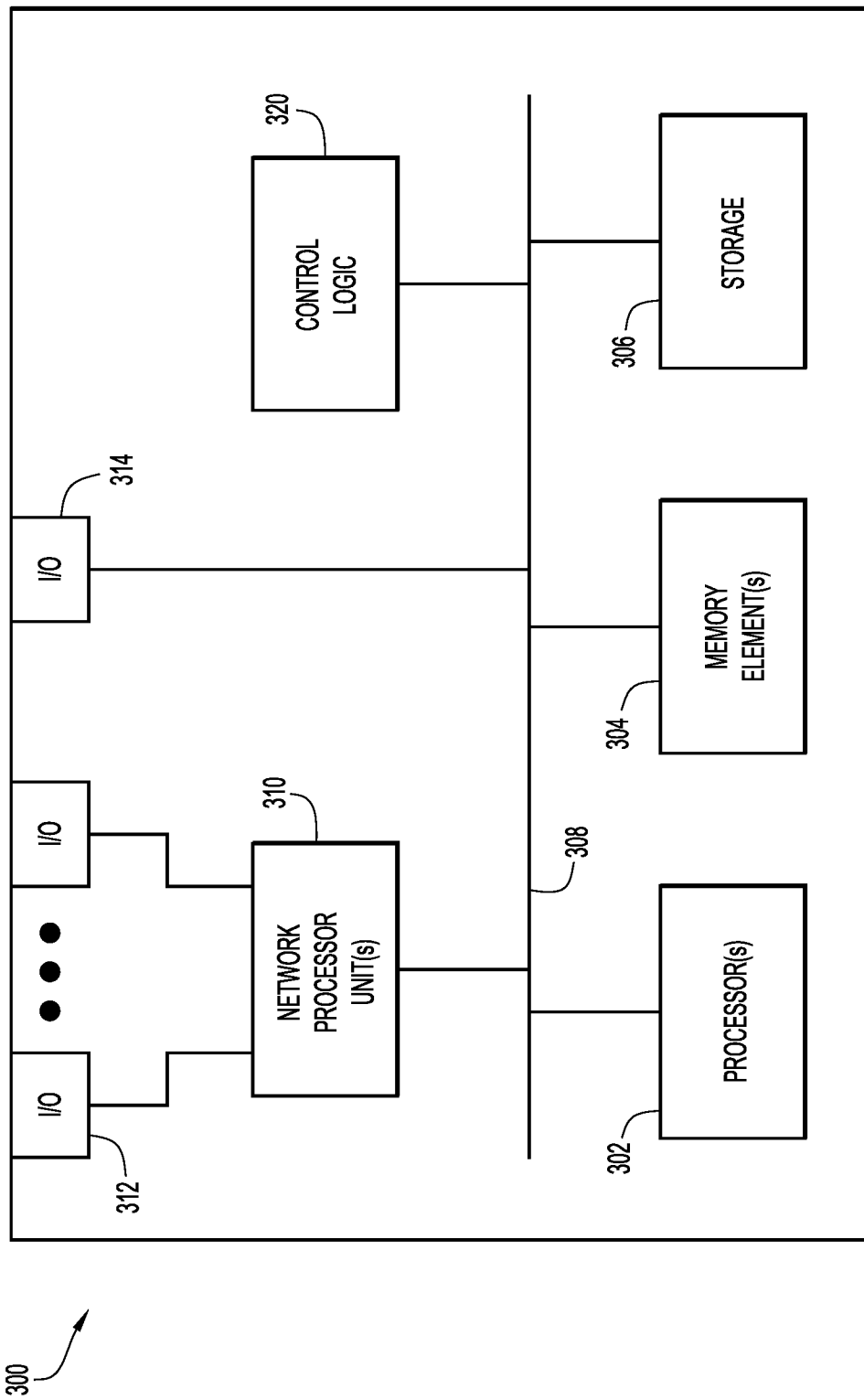
FIG. 3 illustrates a hardware block diagram of a computing device configured to perform functions associated with operations discussed herein, according to an example embodiment.

Referring to FIG. 3, FIG. 3 illustrates a hardware block diagram of a computing device 300 that may perform functions associated with operations discussed herein in connection with the techniques depicted in FIGS. 1 and 2. In various embodiments, a computing device, such as computing device 300 or any combination of computing devices 300, may be configured as any entity/entities as discussed for the techniques depicted in connection with FIGS. 1 and 2 in order to perform operations of the various techniques discussed herein.

In at least one embodiment, computing device may include one or more processor(s) 302, one or more memory element(s) 304, storage 306, a bus 308, one or more network processor unit(s) 310 interconnected with one or more network input/output (I/O) interface(s) 312, one or more I/O interface(s) 314, and control logic 320. In various embodiments, instructions associated with logic for computing device 300 can overlap in any manner and are not limited to the specific allocation of instructions and/or operations described herein.

In at least one embodiment, processor(s) 302 is/are at least one hardware processor configured to execute various tasks, operations and/or functions for computing device 300 as described herein according to software and/or instructions configured for computing device. Processor(s) 302 (e.g., a hardware processor) can execute any type of instructions associated with data to achieve the operations detailed herein. In one example, processor(s) 302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 304 and/or storage 306 is/are configured to store data, information, software, and/or instructions associated with computing device 300, and/or logic configured for memory element(s) 304 and/or storage 306. For example, any logic described herein (e.g., control logic 320) can, in various embodiments, be stored for computing device 300 using any combination of memory element(s) 304 and/or storage 306. Note that in some embodiments, storage 306 can be consolidated with memory elements 304 (or vice versa), or can overlap/exist in any other suitable manner.

In at least one embodiment, bus 308 can be configured as an interface that enables one or more elements of computing device 300 to communicate in order to exchange information and/or data. Bus 308 can be implemented with any architecture designed for passing control, data and/or information between processors, memory elements/storage, peripheral devices, and/or any other hardware and/or software components that may be configured for computing device 300. In at least one embodiment, bus 308 may be implemented as a fast kernel-hosted interconnect, potentially using shared memory between processes (e.g., logic), which can enable efficient communication paths between the processes.

In various embodiments, network processor unit(s) 310 may enable communication between computing device 300 and other systems, entities, etc., via network I/O interface(s) 312 to facilitate operations discussed for various embodiments described herein. In various embodiments, network processor unit(s) 310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 300 and other systems, entities, etc. to facilitate operations for various embodiments described herein. In various embodiments, network I/O interface(s) 312 can be configured as one or more Ethernet port(s), Fibre Channel ports, and/or any other I/O port(s) now known or hereafter developed. Thus, the network processor unit(s) 310 and/or network I/O interfaces 312 may include suitable interfaces for receiving, transmitting, and/or otherwise communicating data and/or information in a network environment.

I/O interface(s) 314 allow for input and output of data and/or information with other entities that may be connected to computer device 300. For example, I/O interface(s) 314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 320 can include instructions that, when executed, cause processor(s) 302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 304 and/or storage 306 can store data, software, code, instructions (e.g., processor instructions), logic, parameters, combinations thereof, and/or the like used for operations described herein. This includes memory elements 304 and/or storage 306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 4:
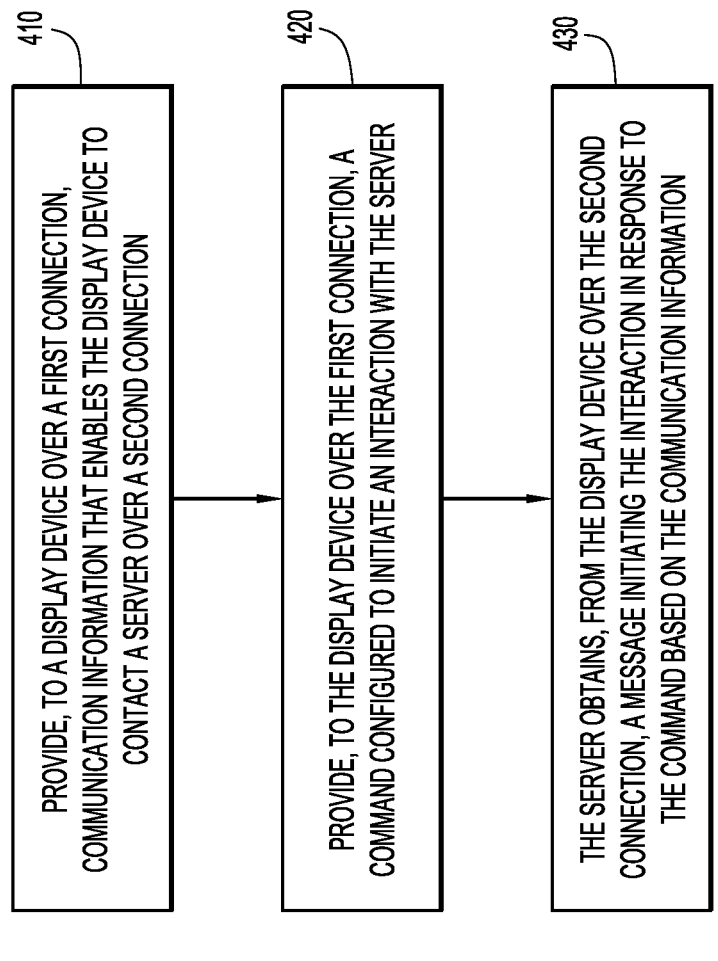
FIG. 4 illustrates a flowchart of a method for performing functions associated with operations discussed herein, according to an example embodiment.

FIG. 4 is a flowchart of an example method 400 for performing functions associated with operations discussed herein. Method 400 may be performed by any suitable entity, such as a video communications device. At operation 410, the video communications device provides, to a display device over a first connection, communication information that enables the display device to contact a server over a second connection. At operation 420, the video communications device provides, to the display device over the first connection, a command configured to initiate an interaction with the server. At operation 430, the server obtains, from the display device over the second connection, a message initiating the interaction in response to the command based on the communication information.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: providing, to a display device over a first connection, communication information that enables the display device to contact a server over a second connection; and providing, to the display device over the first connection, a command configured to initiate an interaction with the server, wherein the server obtains, from the display device over the second connection, a message initiating the interaction in response to the command based on the communication information.

In one example, the first connection and the second connection are a common connection. In a further example, the common connection is an IP connection, the method further comprising: establishing the IP connection using a secure protocol.

In one example, the first connection involves physical proximity to the display device.

In one example, the first connection is a wired connection. In a further example, the wired connection is an HDMI connection.

In one example, the method further comprises: hosting the server.

In one example, providing the communication information and providing the command are performed by a video communications device associated with the display device, wherein the video communications device is not configured to host the server.

In one example, the method further comprises: providing information regarding authentication of a security certificate to be presented to the display device by the server, and wherein the server presents the security certificate to the display device.

In one example, the method further comprises: sharing security credentials with the display device to enable the display device to initiate the interaction with the server.

In one example, the method further comprises: encrypting the communication information or the command with a key that is pre-shared with the display device.

In one example, providing the command includes providing a command to download software or firmware from the server.

In one example, providing the command includes providing a command to read or write at least one configurable setting of the display device from or to the server.

In one example, providing the command includes providing a command to provide a debugging log to the server.

In one example, providing the command includes providing a command to provide display telemetry data to the server. In a further example, the method further comprises: adjusting display data sent to the display device based on the display telemetry data.

In another form, an apparatus is provided. The apparatus comprises: a network interface configured to obtain or provide network communications; and one or more processors coupled to the network interface, wherein the one or more processors are configured to: provide, to a display device over a first connection, communication information that enables the display device to contact the server over a second connection; and provide, to the display device over the first connection, a command configured to initiate an interaction with the server, wherein the server obtains, from the display device over the second connection, a message initiating the interaction in response to the command based on the communication information.

In another form, one or more non-transitory computer readable storage media are provided. The non-transitory computer readable storage media are encoded with instructions that, when executed by a processor, cause the processor to: provide, to a display device over a first connection, communication information that enables the display device to contact a server over a second connection; and provide, to the display device over the first connection, a command configured to initiate an interaction with the server, wherein the server obtains, from the display device over the second connection, a message initiating the interaction in response to the command based on the communication information.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   providing, to a display device over a first connection, communication information that enables the display device to contact a server over a second connection, wherein the communication information includes an identifier and/or address of the server and/or a location of the server;
   providing, to the display device over the first connection, a command configured to initiate an interaction with the server, wherein the command is to provide display telemetry data to the server, wherein the server obtains, from the display device over the second connection, a message initiating the interaction in response to the command based on the communication information; and
   adjusting display data for video communications sent to the display device based on the display telemetry data.

2. The method of claim 1, wherein the first connection and the second connection are a common connection.

3. The method of claim 2, wherein the common connection is an Internet Protocol connection, the method further comprising:
   establishing the Internet Protocol connection using a secure protocol.

4. The method of claim 1, wherein the first connection involves physical proximity to the display device.

5. The method of claim 1, wherein the first connection is a wired connection.

6. The method of claim 5, wherein the wired connection is a High-Definition Multimedia Interface connection.

7. The method of claim 1, further comprising:
hosting the server.

8. The method of claim 1, wherein providing the communication information and providing the command are performed by a video communications device associated with the display device, and wherein the video communications device is not configured to host the server.

9. The method of claim 1, further comprising:
providing information regarding authentication of a security certificate to be presented to the display device by the server, wherein
the server presents the security certificate to the display device.

10. The method of claim 1, further comprising:
sharing security credentials with the display device to enable the display device to initiate the interaction with the server.

11. The method of claim 1, further comprising:
encrypting the communication information or the command with a key that is pre-shared with the display device.

12. The method of claim 1, wherein providing the command includes providing a command to download software or firmware from the server.

13. The method of claim 1, wherein providing the command includes providing a command to read or write at least one configurable setting of the display device from or to the server.

14. The method of claim 1, wherein providing the command includes providing a command to provide a debugging log to the server.

15. An apparatus comprising:
a network interface configured to obtain or provide network communications; and
one or more processors coupled to the network interface, wherein the one or more processors are configured to:
provide, to a display device over a first connection, communication information that enables the display device to contact a server over a second connection, wherein the communication information includes an identifier and/or address of the server and/or a location of the server;
provide, to the display device over the first connection, a command configured to initiate an interaction with the server, wherein the command is to provide display telemetry data to the server, wherein the server obtains, from the display device over the second connection, a message initiating the interaction in response to the command based on the communication information; and
adjust display data for video communications sent to the display device based on the display telemetry data.

16. The apparatus of claim 15, wherein the first connection is a High-Definition Multimedia Interface connection.

17. One or more non-transitory computer readable storage media encoded with instructions that, when executed by a processor, cause the processor to:
provide, to a display device over a first connection, communication information that enables the display device to contact a server over a second connection, wherein the communication information includes an identifier and/or address of the server and/or a location of the server;
provide, to the display device over the first connection, a command configured to initiate an interaction with the server, wherein the command is to provide display telemetry data to the server, wherein the server obtains, from the display device over the second connection, a message initiating the interaction in response to the command based on the communication information; and
adjust display data for video communications sent to the display device based on the display telemetry data.

18. The one or more non-transitory computer readable storage media of claim 17, wherein the first connection is a High-Definition Multimedia Interface connection.

19. The method of claim 1, wherein the display telemetry data includes data relating to a change in a brightness of the display device.

20. The method of claim 19, wherein adjusting the display data includes compensating for the change in the brightness of the display device.

* * * * *